United States Patent
Okagawa (10) Patent No.: US 7,822,034 B2
(45) Date of Patent: Oct. 26, 2010

(54) PATH CONTROLS APPARATUS AND TABLE UPDATING METHOD

(75) Inventor: Hiroshi Okagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 498 days.

(21) Appl. No.: 11/605,356

(22) Filed: Nov. 29, 2006

(65) Prior Publication Data

US 2008/0025311 A1 Jan. 31, 2008

(30) Foreign Application Priority Data

Jul. 31, 2006 (JP) ............................. 2006-209174

(51) Int. Cl.
*H04L 12/28* (2006.01)
(52) U.S. Cl. ...................................... 370/392; 370/401
(58) Field of Classification Search ........................ None
See application file for complete search history.

(56) References Cited

U.S. PATENT DOCUMENTS

| | | | | |
|---|---|---|---|---|
| 5,095,480 A | * | 3/1992 | Fenner | 370/238 |
| 5,488,608 A | * | 1/1996 | Flammer, III | 370/400 |
| 5,633,858 A | * | 5/1997 | Chang et al. | 370/255 |
| 5,764,634 A | * | 6/1998 | Christensen et al. | 370/389 |
| 6,094,434 A | * | 7/2000 | Kotzur et al. | 370/401 |
| 6,233,242 B1 | * | 5/2001 | Mayer et al. | 370/412 |
| 6,330,229 B1 | * | 12/2001 | Jain et al. | 370/256 |
| 6,363,068 B1 | * | 3/2002 | Kinoshita | 370/389 |
| 6,791,949 B1 | * | 9/2004 | Ryu et al. | 370/254 |
| 2003/0123462 A1 | * | 7/2003 | Kusayanagi | 370/401 |
| 2004/0077338 A1 | * | 4/2004 | Hsu et al. | 455/414.1 |
| 2008/0002707 A1 | * | 1/2008 | Davis | 370/392 |
| 2009/0059936 A1 | * | 3/2009 | Van De Poel et al. | 370/401 |

FOREIGN PATENT DOCUMENTS

JP 2006-074554 A 3/2006

* cited by examiner

*Primary Examiner*—Jayanti K Patel
*Assistant Examiner*—Hooman Houshmand
(74) *Attorney, Agent, or Firm*—Fujitsu Patent Center

(57) ABSTRACT

A receiving unit receives a frame from any one of a plurality of ports. When it is determined that there is no entry to which a correspondence relation for a transmission-source address of the received frame can be registered in a management table, a selecting unit detects an indicator bit located at an oldest generation in a bit string obtained by rearranging generation-management bit strings of all entries of the management table, and selects an entry corresponding to the detected indicator bit as an overwriting target entry. An updating unit registers the correspondence relation to the selected overwriting target entry.

18 Claims, 6 Drawing Sheets

| TRANSMISSION-SOURCE ADDRESS | TRANSMISSION-DESTINATION ADDRESS | DATA |
|---|---|---|

FIG.4

| ENTRY NUMBER | TRANSMISSION-SOURCE ADDRESS | RECEPTION-PORT NUMBER | GENERATION-MANAGEMENT BIT STRING | | | | | VACANCY-MANAGEMENT BIT |
|---|---|---|---|---|---|---|---|---|
| | | | 0 | 1 | 2 | | n | |
| 0 | aaa.bbb.ccc.d | 158 | 1 | 0 | 0 | ..... | 0 | 0 |
| 1 | ppp.qqq.rrr.s | 38898 | 0 | 0 | 1 | ..... | 0 | 0 |
| 2 | | | 0 | 0 | 0 | | 0 | 1 |
| ⋮ | | | | | | | | |

| ENTRY | GENERATION | | | | |
|---|---|---|---|---|---|
| | 0 | 1 | 2 | 3 | 4 |
| 0 | 0 | 0 | 0 | 1 | 0 |
| 1 | 0 | 0 | 1 | 0 | 0 |
| 2 | 0 | 0 | 0 | 0 | 1 |
| 3 | 0 | 1 | 0 | 0 | 0 |

PATH CONTROLS APPARATUS AND TABLE UPDATING METHOD

BACKGROUND OF THE INVENTION

1. Field of the Invention

The present invention generally relates to a technology for controlling a communication path, and specifically relates to a technology for controlling a communication path by relaying a frame including a transmission-source address and a transmission-destination address.

2. Description of the Related Art

In recent years, a technology such as a synchronous digital hierarchy (SDH) and an asynchronous transfer mode (ATM) has been mainly used in a core network having broad bandwidth and high reliability (for example, an Internet service provider (ISP) and a contents distribution network (CDN)).

However, with a technical innovation, because a variety of local-area-network (LAN) devices have become available at a moderate price, which makes a majority of end users including major enterprise users employ a LAN using an Ethernet (registered trademark) and an Internet protocol (IP), an introduction of the Ethernet (registered trademark) and the IP is rolling forward.

In such a network, a path control apparatus that controls a communication path of a frame, such as an Ethernet (registered trademark) switch and an IP router, is taking a critical role. The path control apparatus reads out a transmission-source address and a transmission-destination address stored in a header of a frame, and controls the communication path appropriately so that the frame makes it to a desired transmission-destination address. The path control apparatus generally maintains a correspondence relation between an address and a port through which a frame is input or output in a table format. When a frame is input, the path control apparatus acquires a port corresponding to the same address as the transmission-destination address stored in the header of the frame from the table, and controls the communication path by outputting the frame to the acquired port.

The correspondence relation between the address and the port in the path control apparatus is learned by associating a transmission-source address of a frame at a time when the frame is input and a port at which the frame arrived. Then, if another frame is not input again from the same transmission-source address within a predetermined time since the correspondence relation has been learned, the correspondence relation for the transmission-source address is deleted from the table because the reliability of the correspondence relation is decreased. This process of deleting the correspondence relation is generally referred to as an aging process.

In the aging process, because a correspondence relation between a specific transmission-source address and a port is deleted when a predetermined time has been elapsed since the latest time at which a frame had arrived from the specific transmission-source address, it is necessary to calculate a time elapsed from the latest frame arrival time for all of the correspondence relations as needed, which may result in an increase of the processing load. To cope with the problem, Japanese Patent Application Laid-open No. 2006-74554 discloses a technology for deleting the correspondence relation efficiently, in which a bit string of the same size is provided for each of the correspondence relations, a specific bit indicating a frame arrival in the bit string is shifted at a predetermined cycle, and when the specific bit is shifted to the end of the bit string, a correspondence relation corresponding to the bit string is deleted.

The number of correspondence relations (entries) that can be registered in the table is fixed, because the table maintained by the path control apparatus has a limited size. Therefore, when a large number of frames are input to the path control apparatus, it can happen that there is no vacancy in the entry of the table, which leads to a situation requiring an overwriting of the correspondence relation registered to any one of the entries.

However, when overwriting the correspondence relation, it is not easy to select an entry to be overwritten with fair and efficiency. In other words, if a correspondence relation having a transmission-source address from which a frame is input at frequent intervals is deleted when overwriting the entry, it will cause the overwriting of the entry to be occurred too often. As a result, the efficiency of the overwriting of the entry becomes worse. Although it can considered to be another method to overwrite a correspondence relation having the longest time elapsed since the latest frame arrival time, in this case, it is necessary to calculate the time elapsed for all of the entries, resulting in an increase of the processing load and the processing time.

If the table of the path control apparatus is not updated efficiently, because a case in which the same address as a transmission-destination address of a frame is not registered to the table occurs frequently, there will be a limit in the control of the communication path of the frame, resulting in a decrease of the throughput of the whole network.

SUMMARY OF THE INVENTION

It is an object of the present invention to at least partially solve the problems in the conventional technology.

According to an aspect of the present invention, a path control apparatus that controls a communication path by relaying a frame including a transmission-source address and a transmission-destination address includes a receiving unit that includes a plurality of ports, and receives the frame from any one of the ports; a storage unit that stores therein a management table that includes a correspondence relation between the transmission-source address of the frame and a port through which the frame is received in each entry, and a generation-management bit string in which an indicator bit is arranged at a position corresponding to a time elapsed since the entry is updated for each entry; a determining unit that determines whether there is an entry to which the correspondence relation for the transmission-source address of the received frame can be registered; a selecting unit that, when the determining unit determines that there is no entry to which the correspondence relation can be registered, detects the indicator bit located at a position indicating a longest time elapsed in a bit string obtained by rearranging the generation-management bit strings of all entries according to the time elapsed, and selects an entry corresponding to the detected indicator bit as an overwriting target entry to be overwritten; and an updating unit that updates the management table in the storage unit by registering the correspondence relation between the transmission-source address of the frame and the port through which the frame is received to the selected overwriting target entry.

According to another aspect of the present invention, a table updating method for a path control apparatus that controls a communication path by relaying a frame including a transmission-source address and a transmission-destination address, includes receiving the frame from any one of a plurality of ports; determining whether there is an entry to which a correspondence relation for the transmission-source address of the frame can be registered in a management table that stores the correspondence relation between the transmission-source address of the frame and a port through which the frame is received in each entry, and holds a generation-management bit string in which an indicator bit is arranged at a position corresponding to a time elapsed since the entry is updated for each entry; detecting, when it is determined that there is no entry to which the correspondence relation can be registered at the determining, the indicator bit located at a position indicating a longest time elapsed in a bit string obtained by rearranging the generation-management bit strings of all entries according to the time elapsed; selecting an entry corresponding to the detected indicator bit as an overwriting target entry to be overwritten; and updating the management table by registering the correspondence relation between the transmission-source address of the received frame and the port through which the frame is received to the selected overwriting target entry.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 1:
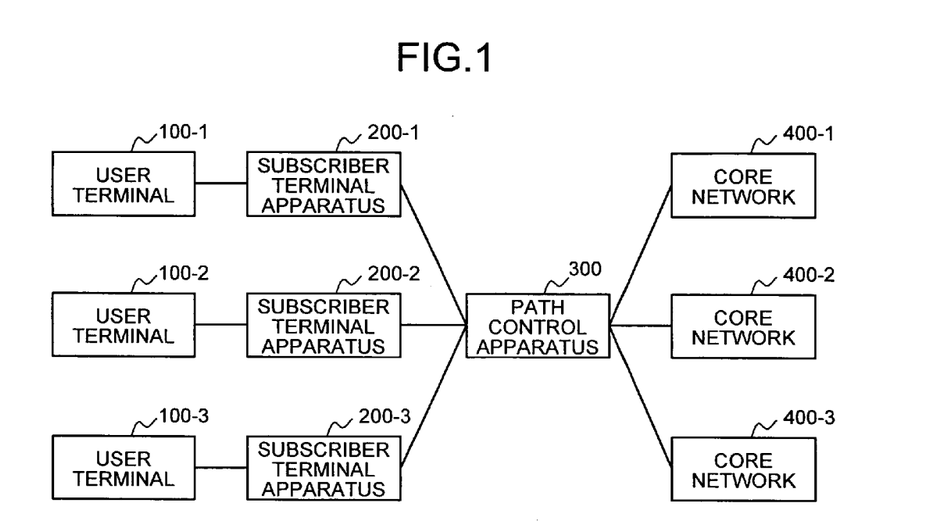
FIG. 1 is a block diagram of a communication network according to an embodiment of the present invention.

FIG. 1 is a block diagram of a communication network 10 according to an embodiment of the present invention. In the communication network according to the present embodiment, a plurality of user terminals 100-1 to 100-3 are connected to a plurality of subscriber terminal apparatuses 200-1 to 200-3, respectively, and the subscriber terminal apparatuses 200-1 to 200-3 are connected to a plurality of core networks 400-1 to 400-3 via a path control apparatus 300, respectively.

Each of the user terminals 100-1 to 100-3 is a terminal apparatus of an end user, and transmits and receives an Ethernet (registered trademark) frame and an IP frame. A unique media-access-control (MAC) address and an IP address are allocated to each of the user terminals 100-1 to 100-3. The MAC address is a transmission-source address or a transmission-destination address of the Ethernet frame, and the IP address is a transmission-source address or a transmission-destination address of the IP frame.

Each of the subscriber terminal apparatuses 200-1 to 200-3 is a digital service unit (DSU) in a digital line or an optical network unit (ONU) in an optical-fiber communication line, and connects the user terminals 100-1 to 100-3 to the lines on a side of the core networks 400-1 to 400-3.

The path control apparatus 300 controls, when a frame arrives from the user terminals 100-1 to 100-3 or from the core networks 400-1 to 400-3, a communication path of the frame after confirming a transmission-destination address of the frame. At this moment, the path control apparatus 300 first stores a transmission-source address of the frame in association with a port at which the frame arrived in a path-management table 330. After that, the path control apparatus 300 searches the transmission-destination address of the frame from the path-management table 330, and outputs the frame to a port corresponding to the transmission-destination address.

Upon associating the transmission-source address with the port, if there is no vacant entry in the path-management table 330, the path control apparatus 300 selects an entry to be overwritten by using a generation-management bit string that is used for an aging process. Details of the process of selecting the entry to be overwritten by the path control apparatus 300 will be explained later.

Each of the core networks 400-1 to 400-3 is a network that plays a central role in the Internet, and forms the foundation of a communication network by the Ethernet and the IP.

Figure 2:
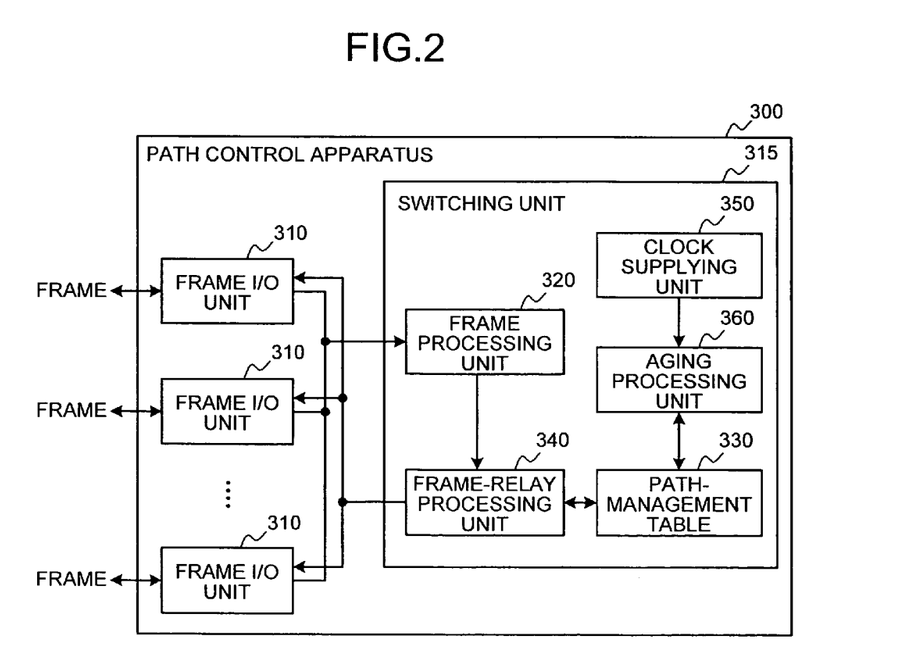
FIG. 2 is a detailed block diagram of a path control apparatus shown in FIG. 1.

FIG. 2 is a detailed block diagram of the path control apparatus 300. The path control apparatus 300 includes a plurality of frame input/output (I/O) units 310 and a switching unit 315. The switching unit 315 includes a frame processing unit 320, the path-management table 330, a frame-relay processing unit 340, a clock supplying unit 350, and an aging processing unit 360.

Figure 3:
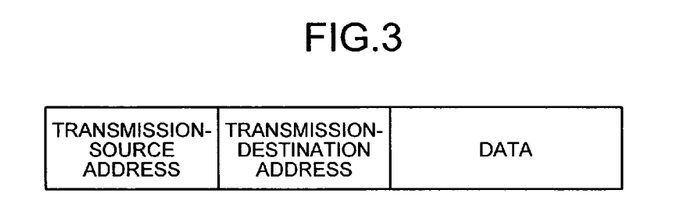
FIG. 3 is an example of contents of a frame shown in FIG. 2.

Each of the frame I/O units 310 are connected to the subscriber terminal apparatuses 200-1 to 200-3 and the core networks 400-1 to 400-3, respectively, and receives and outputs a frame. The frame has a configuration shown in FIG. 3 or some other similar configuration. In other words, the frame I/O unit 310 receives and outputs a frame in which a header including a transmission-source address and a transmission-destination address is appended to data. If the frame is an Ethernet frame, each of the transmission-source address and the transmission-destination address is a MAC address, and if the frame is an IP frame, each of the transmission-source address and the transmission-destination address is an IP address. Because it does not make substantially any difference whether the frame is the Ethernet frame or the IP frame, a terminology such as a "frame" or an "address" is simply used hereinafter, and the protocol is not distinguished between the Ethernet and the IP.

When the frame I/O unit 310 receives a frame, the frame processing unit 320 extracts the transmission-source address and the transmission-destination address stored in the header of the input, and outputs the extracted transmission-source address and the extracted transmission-destination address to the frame-relay processing unit 340. In addition, the frame processing unit 320 outputs the frame to the frame-relay processing unit 340 as it is.

Figure 4:
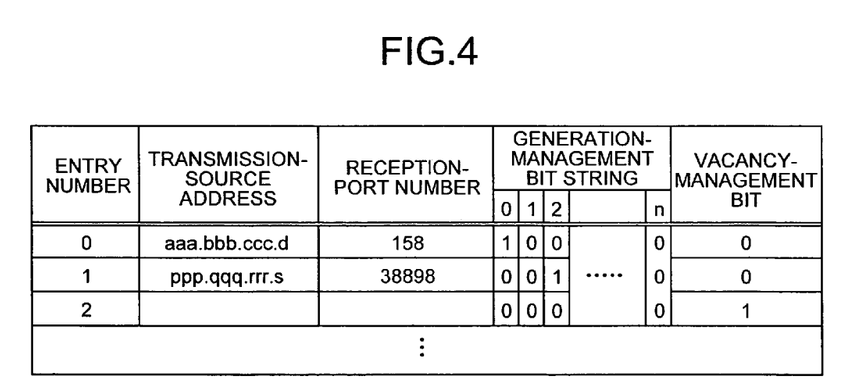
FIG. 4 is an example of contents of a path-management table shown in FIG. 2.

The path-management table 330 stores the transmission-source address of the frame to the frame I/O unit 310 in association with a port at which the framed arrived. Furthermore, the path-management table 330 maintains a generation-management bit string that manages a time elapsed since the latest time at which the correspondence relation is registered for each of the entries to which the correspondence relation between the transmission-source address and the reception port can be registered and a vacancy-management bit that manages a vacancy state of the entry. In other words, the path-management table 330 is configured, for example, as shown in FIG. 4, in which a transmission-source address and a reception-port number can be registered for a predetermined number of entries, with the generation-management bit string of (n+1) bits from a generation 0 to a generation n and the vacancy-management bit of 1 bit.

The frame-relay processing unit 340 registers the correspondence relation between the transmission-source address and the reception port output from the frame processing unit 320 to the path-management table 330. At this moment, the frame-relay processing unit 340 searches whether the transmission-source address is already registered to the path-management table 330. If the transmission-source address is registered to the path-management table 330, the frame-relay processing unit 340 updates the reception port corresponding to the transmission-source address, sets "1" to a bit corresponding to the newest generation in the generation-management bit string, and sets "0" to all other bits in the generation-management bit string. On the other hand, if the transmission-source address is not registered to the path-management table 330, the frame-relay processing unit 340 detects a bit of "1" that indicates a vacant entry by referring to the vacancy-management bit, stores the transmission-source address in association with the reception port in the vacant entry, and changes the vacancy-management bit of the entry to "0" that indicates the entry is in use. Furthermore, if there is no vacant entry in the path-management table 330, the frame-relay processing unit 340 selects an entry having the longest time elapsed since the entry has been registered, as an entry to be overwritten, by using the generation-management bit string, and stores the transmission-source address in association with the reception port in the selected entry.

After that, the frame-relay processing unit 340 searches a transmission-destination address output from the frame processing unit 320 from the transmission-source address stored in the path-management table 330, and determines a corresponding reception port as an output destination of the frame. If the transmission-destination address is not registered in the path-management table 330, the frame-relay processing unit 340 determines all of the ports as the output destination of the frame. Details of the configuration and the operation of the frame-relay processing unit 340 will be explained later.

The clock supplying unit 350 generates a clock at predetermined intervals, and supplies the generated clock to the aging processing unit 360. The clock supplying unit 350 generates a clock that equally divides an aging time until the correspondence relation between the transmission-source address and the reception port registered to the path-management table 330 is deleted by the aging process.

The aging processing unit 360 shifts all bits of "1" included in the generation-management bit string of the path-management table 330 in a predetermined cycle based on the clock supplied from the clock supplying unit 350. For instance, if the generation 0 is the newest generation and the generation n is the oldest generation, the aging processing unit 360 a position of the bit of "1" in the generation-management bit string of each of the entries toward a direction of the generation n by one. The bit of "1" in the generation-management bit string is used as an indicator bit that indicates the time elapsed since the entry is updated. In addition, the aging processing unit 360 performs the aging process of deleting an entry for which a predetermined cycle has passed since the bit of the generation n has set to "1". Therefore, if a time of the predetermined cycle multiplied by (n+1) has passed since the correspondence relation between the transmission-source address and the reception port has been registered without being updated, each of the entries in the path-management table 330 will be deleted.

The frame processing unit 320, the path-management table 330, the frame-relay processing unit 340, the clock supplying unit 350, and the aging processing unit 360 form a switching unit that determines a communication path of a frame input to the path control apparatus 300.

Figure 5:
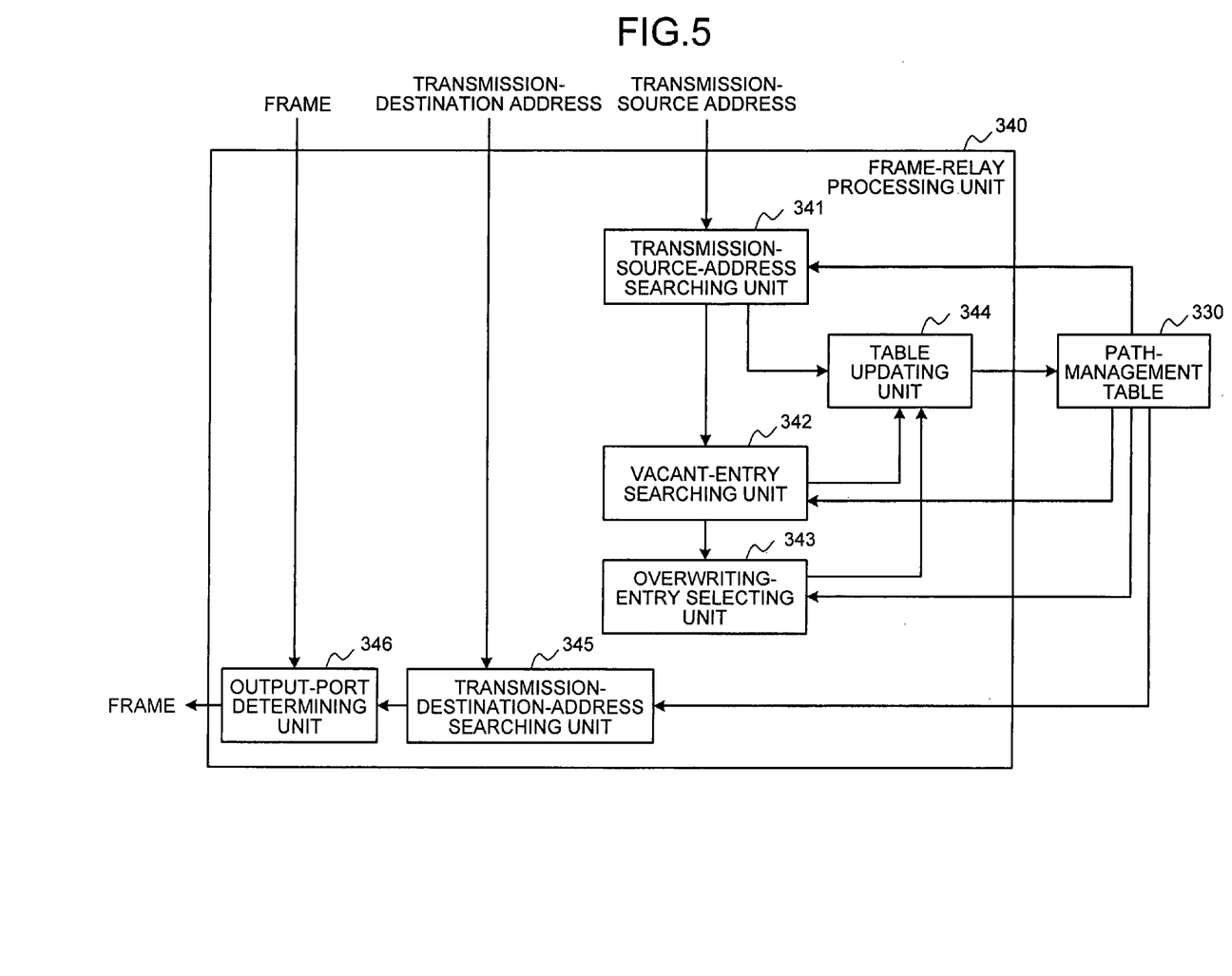
FIG. 5 is a detailed block diagram of a frame-relay processing unit shown in FIG. 2.

FIG. 5 is a detailed block diagram of the frame-relay processing unit 340. The frame-relay processing unit 340 includes a transmission-source-address searching unit 341, a vacant-entry searching unit 342, an overwriting-entry selecting unit 343, a table updating unit 344, a transmission-destination-address searching unit 345, and an output-port determining unit 346.

The transmission-source-address searching unit 341 acquires the transmission-source address output from the frame processing unit 320, and searches whether the transmission-source address is registered to the path-management table 330. If the transmission-source address is registered to the path-management table 330, the transmission-source-address searching unit 341 instructs the table updating unit 344 to update the reception-port number corresponding to the transmission-source address, and if the transmission-source address is not registered to the path-management table 330, notifies the vacant-entry searching unit 342 that the transmission-source address is not registered.

Upon receiving a notification that the transmission-source address is not registered to the path-management table 330 from the transmission-source-address searching unit 341, the vacant-entry searching unit 342 searches a vacant entry in which the vacancy-management bit of the path-management table 330 is set to "1". If there is a vacant entry having the vacancy-management bit set to "1", the vacant-entry searching unit 342 instructs the table updating unit 344 to register the transmission-source address and the reception-port number to the vacant entry. On the other hand, if there is no vacant entry, the vacant-entry searching unit 342 notifies the overwriting-entry selecting unit 343 that there is no vacant entry in the path-management table 330.

Upon receiving a notification that there is no vacant entry from the vacant-entry searching unit 342, the overwriting-entry selecting unit 343 rearranges the generation-management bit string of the path-management table 330, couples bits of all of the entries for each generation, and inputs a bit string obtained by coupling the bits to an internal priority encoder to detect a bit of "1" at a direction of the oldest generation in the bit string. Then, the overwriting-entry selecting unit 343 instructs the table updating unit 344 to register the transmission-source address and the reception-port number to an entry to be overwritten (hereinafter, "overwriting entry") corresponding to the detected bit of "1".

In addition, the overwriting-entry selecting unit 343 performs a logical AND operation for the bit of the newest generation from among the bit string obtained by rearranging the generation-management bit string with a mask for round robin in which all bits are set to "1" at an initial state, and inputs a bit string after the operation to the priority encoder. If the bit of the newest generation is detected by the priority encoder, the overwriting-entry selecting unit 343 changes all bits of the mask for round robin corresponding to the detected bit to "0". When all bits of the mask for round robin become "0", the overwriting-entry selecting unit 343 initializes the mask for round robin by resetting all bits to "1". Details of the mask for round robin will be explained later.

The table updating unit 344 receives instructions from the transmission-source-address searching unit 341, the vacant-entry searching unit 342, and the overwriting-entry selecting unit 343, and updates the path-management table 330 based on the received instructions. Upon receiving an instruction from the transmission-source-address searching unit 341, the table updating unit 344 updates the reception-port number corresponding to the searched transmission-source address, and changes a position of the bit of "1" in the generation-management bit string to the newest generation. Upon receiving an instruction from the vacant-entry searching unit 342, the table updating unit 344 registers the transmission-source address and the reception-port number to the instructed vacant entry, sets "1" to the bit of the newest generation in the generation-management bit string, and sets "0" to the vacancy-management bit. Upon receiving an instruction from the overwriting-entry selecting unit 343, the table updating unit 344 overwrites the transmission-source address and the reception-port number in the instructed overwriting entry, and changes a position of the bit of "1" in the generation-management bit string to the newest generation.

The transmission-destination-address searching unit 345 acquires the transmission-destination address output from the frame processing unit 320 and searches whether the transmission-destination address is registered to the path-management table 330 as the transmission-source address. If the transmission-destination address is registered, the transmission-destination-address searching unit 345 reads out the reception-port number corresponding to the registered transmission-source address, and outputs the reception-port number to the output-port determining unit 346. On the other hand, if the transmission-destination address is not registered, the transmission-destination-address searching unit 345 notifies the output-port determining unit 346 that the transmission-destination address is not registered.

The output-port determining unit 346 determines a port to output the frame based on an output status of the reception-port number from the transmission-destination-address searching unit 345. If the reception-port number is output from the transmission-destination-address searching unit 345, the output-port determining unit 346 determines to output the frame to the port, and outputs the frame to the frame I/O unit 310 corresponding to the determined port. On the other hand, if it is notified that the transmission-destination address is not registered to the path-management table 330 from the transmission-destination-address searching unit 345, the output-port determining unit 346 determines to output the frame to all of the ports, and outputs the frame to all of the frame I/O units 310. In this case, although the frame is received by an unrelated user and an unrelated core network, it is possible to discard the received frame at transmission destinations other than the related transmission destination by confirming the transmission-destination address of the frame.

Figure 6:
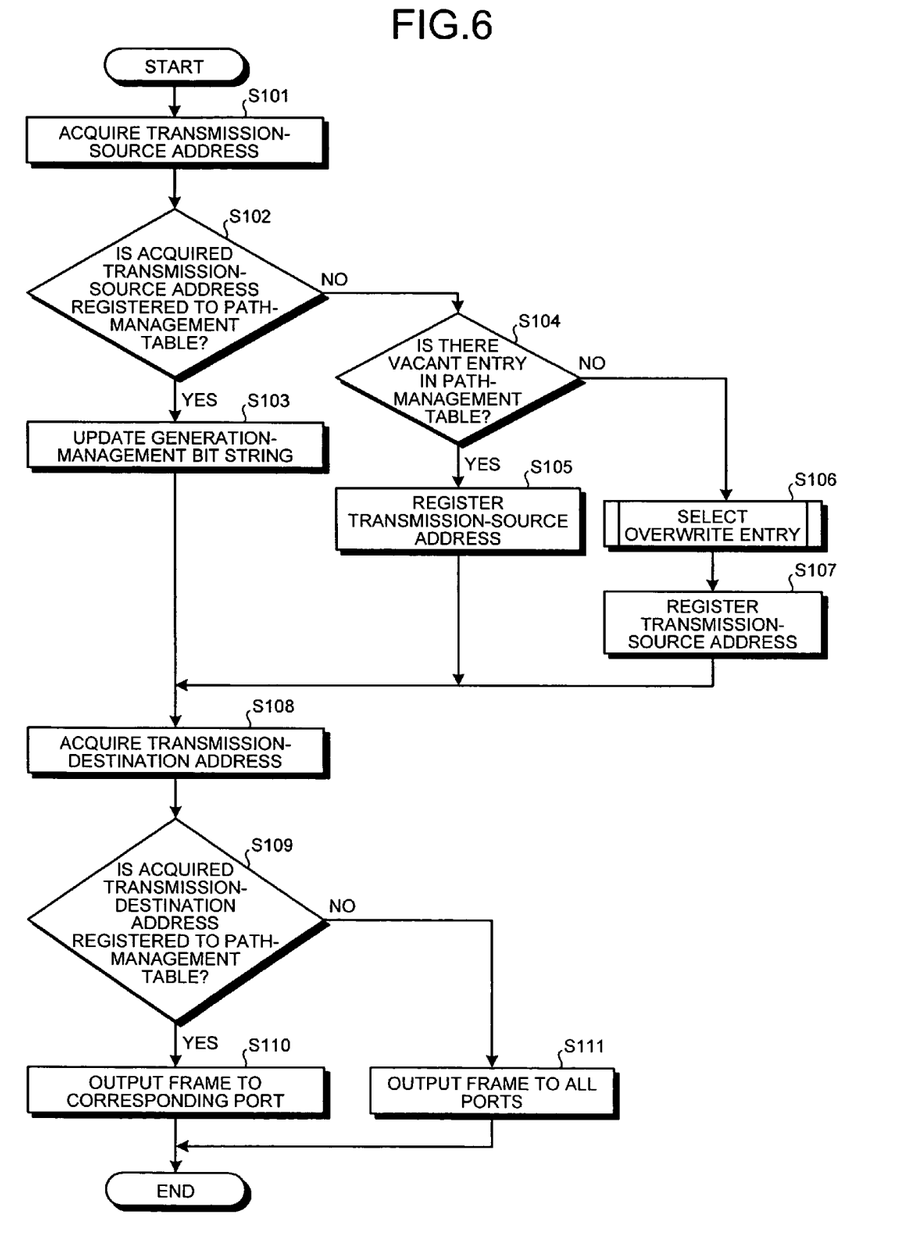
FIG. 6 is a flowchart of a frame relay according to the present embodiment.

Details of an operation of a frame relay by the frame-relay processing unit 340 configured as described above will be explained with reference to a flowchart shown in FIG. 6.

First, when any one of the frame I/O units 310 receives a frame it outputs the frame to the frame processing unit 320. The frame processing unit 320 outputs a transmission-source address and a transmission-destination address stored in a header of the frame and the frame itself to the frame-relay processing unit 340.

The transmission-source address is acquired by the transmission-source-address searching unit 341 in the frame-relay processing unit 340 (Step S101), and it is searched whether the transmission-source address is registered to the path-management table 330 (Step S102). As a result of the search, if the transmission-source address is registered to the path-management table 330 ("YES" at Step S102), a reception-port number corresponding to the transmission-source address is updated by the table updating unit 344, and a position of the bit of "1" in the generation-management bit string is changed to the newest generation (Step S103). With this scheme, even if the position of the bit of "1" in the generation-management bit string is shifted by the aging processing unit 360 in a predetermined cycle, if a frame from the same transmission-source address is input frequently, the bit of "1" in the generation-management bit string will not reach for a position of the oldest generation, so that the entry will not be deleted by the aging processing unit 360.

On the other hand, if the transmission-source address is not registered to the path-management table 330 ("NO" at Step S102), a vacant entry in which the vacancy-management bit of the path-management table 330 is set to "1" is searched by the vacant-entry searching unit 342 (Step S104). As a result of the search, if there is a vacant entry ("YES" at Step S104), the transmission-source address is registered in association with the reception-port number to the vacant entry by the table updating unit 344 (Step S105), a bit of the newest generation in the generation-management bit string of the entry is changed to "1", and the vacancy-management bit is changed to "0".

On the other hand, if there is no vacant entry ("NO" at Step S104), the generation-management bit string is rearranged by the overwriting-entry selecting unit 343, and an entry in which a bit of "1" is positioned at the oldest generation is fairly selected as an overwriting entry by using a bit string obtained by rearranging the generation-management bit string (Step S106). The selection of the overwriting entry is performed by inputting the bit string obtained from the generation-management bit string to a priority encoder in the overwriting-entry selecting unit 343, detecting a bit of "1" positioned at a direction of the oldest generation, and selecting an entry corresponding to the detected bit. Details of the selection of the overwriting entry will be explained later.

When the overwriting entry is selected, transmission-source address is registered in association with the reception-port number to the selected entry by the table updating unit 344 (Step S107), and a position of the bit of "1" in the generation-management bit string of the entry is changed to the newest generation.

When the correspondence relation between the transmission-source address and the reception-port number is registered to any one of the entries of the path-management table 330, as described above, a transmission-destination address is subsequently acquired by the transmission-destination-address searching unit 345 (Step S108), and it is searched whether a transmission-source address that is the same as the transmission-destination address is registered to the path-management table 330 (Step S109). As a result of the search, if the transmission-source address that is the same as the transmission-destination address is registered to the path-management table 330 ("YES" at Step S109), a reception-port number corresponding to the transmission-source address is read out by the transmission-destination-address searching unit 345, and the reception-port number is notified to the output-port determining unit 346. After that, it is determined to output the frame to the port notified from the transmission-destination-address searching unit 345 by the output-port determining unit 346, and the frame is output to the frame I/O unit 310 corresponding to the determined port (Step S110). With this scheme, the frame will be transmitted only to the transmission-source address.

On the other hand, if the transmission-source address that is the same as the transmission-destination address is not registered to the path-management table 330 ("NO" at Step S109), it is notified to the output-port determining unit 346 that the transmission-source address is not registered. Then it is determined to output the frame to all of the ports by the output-port determining unit 346, and the frame is output to the frame I/O units 310 corresponding to all of the ports (Step S111). In this case, although the frame is transmitted to addresses other than the transmission-destination address, it is possible to discard the received frame at transmission destinations other than the related transmission destination by confirming the transmission-destination address of the frame.

Figure 7:
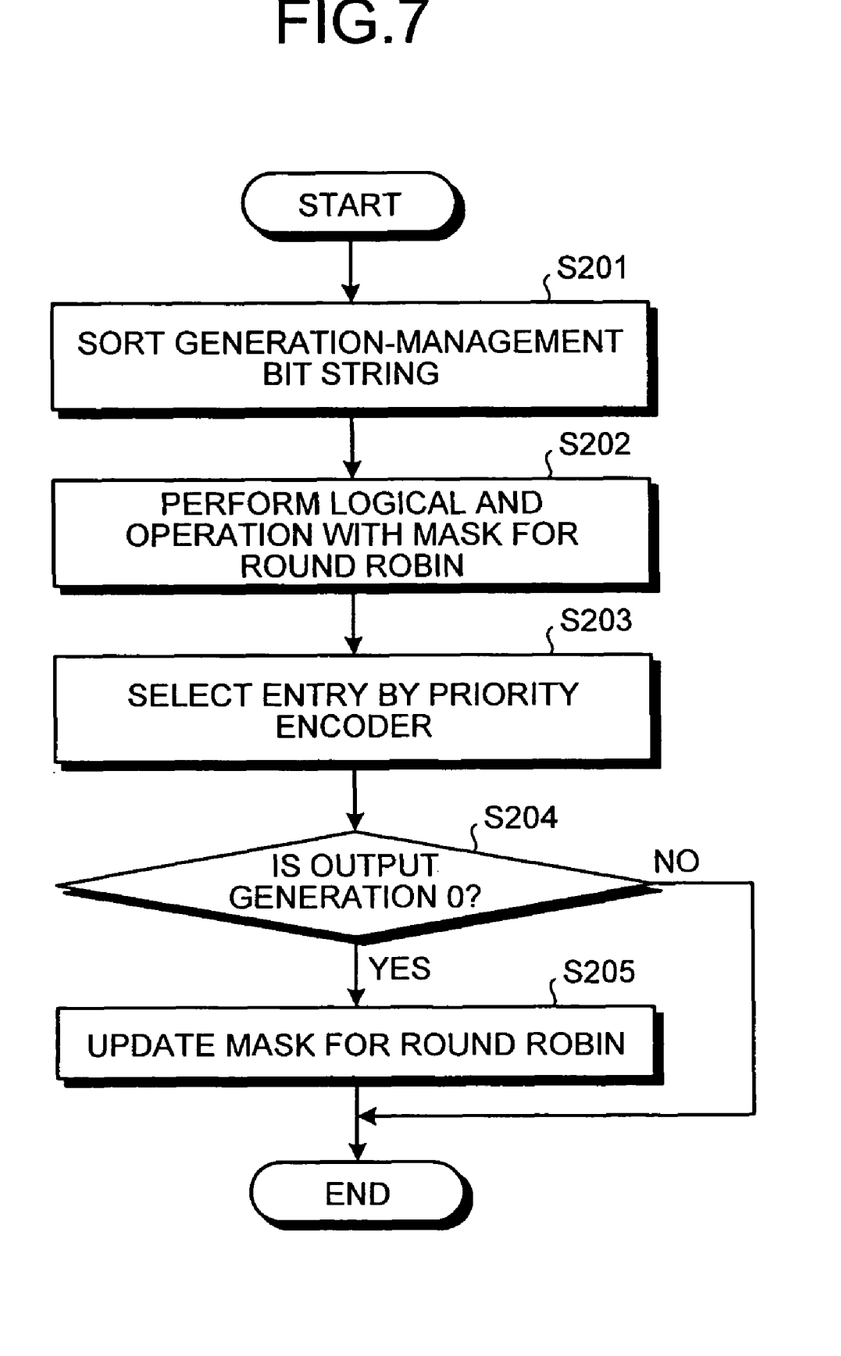
FIG. 7 is a flowchart of an overwriting entry selection according to the present embodiment.

Details of an operation of selecting the overwriting entry when registering the transmission-source address to the path-management table 330 will be explained with reference to a flowchart shown in FIG. 7.

When a frame is received in the path control apparatus 300, as described above, the correspondence relation between the transmission-source address and the reception-port number stored in the header of the frame is registered to the path-management table 330. However, if there is no vacant entry in the path-management table 330, an overwriting entry is selected. In a process of selecting the overwriting entry, a generation-management bit string is employed, which is used for reducing a load of an aging process by the aging processing unit 360.

Figure 8A:
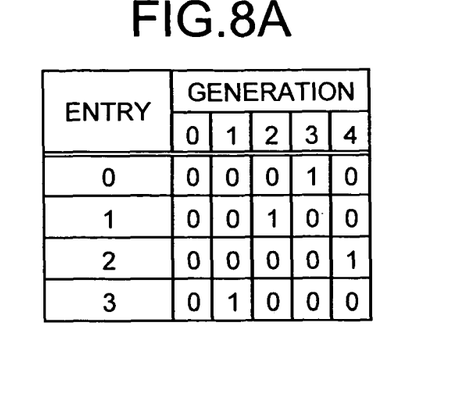
FIG. 8A is an example of a generation-management bit string according to the present embodiment.
Figure 8B:
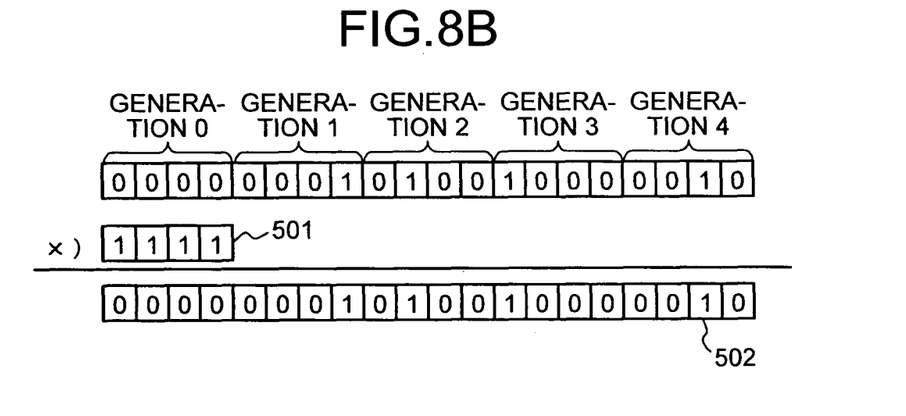
FIG. 8B is an example of the overwriting entry selection according to the present embodiment.

The generation-management bit strings of all entries are coupled and rearranged for each generation by the overwriting-entry selecting unit 343 (Step S201). For instance, as shown in FIG. 8A, it is assumed that four entries from an entry 0 to an entry 3 are provided in the path-management table 330, and the generation-management bit string corresponding to each of the entries includes five generations from a generation 0 to a generation 4, where the generation 0 is the newest generation and the generation 4 is the oldest generation. At this moment, the rearrangement of the generation-management bit string is performed by coupling bits of the generation 0 from the entry 0 to the entry 3, followed by coupling bits of the generation 1 from the entry 0 to the entry 3, and finally coupling bits of the generation 4 from the entry 0 to the entry 3. As a result of the rearrangement of the generation-management bit string, a bit string having consecutive 20 bits is obtained, as shown in FIG. 8B.

After rearranging the generation-management bit string, a logical AND operation is performed with the newest bit portion of the obtained bit string and a mask for round robin by the overwriting-entry selecting unit 343 (Step S202). The mask for round robin is a bit string held by the overwriting-entry selecting unit 343, and is formed with the same number of bits as the number of entries of the path-management table 330. At an initial state, all of the bits of the mask for round robin are set to "1". The logical AND operation is performed, for example, as shown in FIG. 8B. In the example shown in FIG. 8B, a portion of the generation 0, which is the newest generation, is logically multiplied by a mask for round robin 501 that is formed with four bits that is equal to the number of entries. At this moment, all the bits of the mask for round robin 501 are set to "1" because the mask for round robin 501 is in the initial state; and therefore, a result of the logical AND operation is the same as the bit string obtained by rearranging the generation-management bit string.

The result of the logical AND operation is input to an internal priority encoder by the overwriting-entry selecting unit 343, and a bit of "1" at a direction of the oldest generation in the result of the logical AND operation is detected. In the example shown in FIG. 8B, a bit 502 at the right side is detected. Then, an entry corresponding to the bit 502 is selected as the overwriting entry by the overwriting-entry selecting unit 343 (Step S203). As a result, in the example shown in FIG. 8B, the entry 2 corresponding to the bit 502 is selected as the overwriting entry.

Referring to FIG. 8A, in the generation-management bit string of the entry 2, a bit of "1" is located at a position of the generation 4, which means that the time elapsed since the correspondence relation between the transmission-source address and the reception-port number is registered is longer than those of the other entries. Therefore, it can be considered that the entry 2 has the lowest reliability of the correspondence relation, and it is reasonable to select the entry 2 as the overwriting entry. In addition, when the entry 2 is overwritten, a position of the bit of "1" in the generation-management bit string of the entry 2 is changed to the generation 0. Therefore, unless the correspondence relations of the other entries are changed, the entry 2 will not be selected as the overwriting entry again. In this manner, by rearranging the generation-management bit strings of all of the entries and detecting a rightmost bit of "1" from the rearranged bit string by the priority encoder, it is possible to select an overwriting entry with fair.

Furthermore, it is determined whether a bit of "1" of the generation 0, which is the newest generation, has been output from the priority encoder, by the overwriting-entry selecting unit 343 (Step S204). When the bit of "1" of the generation 0 has been detected as the bit of "1" at the direction of the oldest generation ("YES" at Step S204), a bit of the mask for round robin 501 corresponding to the detected bit is changed to "0" (Step S205). On the other hand, when the bit of "1" of the generation 4 has been detected as the bit of "1" at the direction of the oldest generation, as described in the above example, ("NO" at Step S204), the process ends without changing the mask for round robin 501.

In the example described above, the bit of "1" is located at a position other than the generation 0 in the generation-management bit strings of each of the entries (see FIG. 8A). However, if the correspondence relations of each of the entries are updated at the virtually same time, the bit of "1" may be located at the position of the generation 0 in the generation-management bit strings of all of the entries. In this case, when the generation-management bit string is rearranged by the overwriting-entry selecting unit 343, a bit string in which all bits of the generation 0 are "1" and all bits of other generations are "0", as shown in FIG. 8C.

If the bit of "1" at the direction of the oldest generation is detected by the priority encoder without performing a logical AND operation with the bit string and the mask for round robin 501, the entry 3 will be selected as the overwriting entry. Then, the correspondence relation of the entry 3 is overwritten, and a bit of the generation 0 is set to "1" in the generation-management bit string of the entry 3. At this moment, there will be no problem if a timing at which a bit of "1" in the generation-management bit strings of the other entries is shifted to the generation 1 by the aging processing unit 360 is provided until the entry 3 is overwritten. However, if the position of the bit of "1" is still at the generation 0 in the generation-management bit strings of the other entries, a case in which the bit of "1" is located at the position of the generation 0 in the generation-management bit strings of all of the entries occurs again. Therefore, when selecting the next overwriting entry, the entry 3 will be selected as the overwriting entry again, which is unfair.

To cope with the problem, for the portion of the generation 0 from among the bit string obtained by rearranging the generation-management bit string, if a bit of the generation 0 is detected as the bit of "1" at the direction of the oldest generation after performing the logical AND operation with the mask for round robin 501, the bit of the mask for round robin 501 corresponding to the detected bit is changed to "0". Then, at the time of selecting the next overwriting entry, the detected bit will be logically multiplied by the bit of "0" of the mask for round robin 501, and as a result, it will not be selected as the bit of "1" at the direction of the oldest generation by the priority encoder.

Figure 8C:
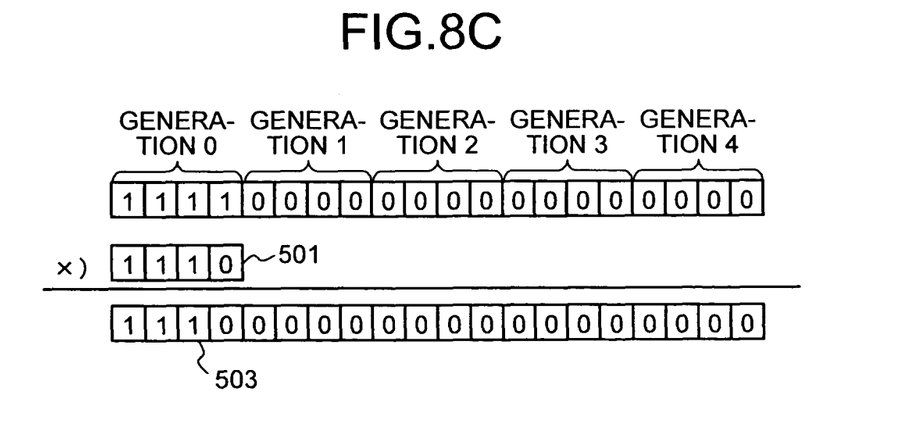
FIG. 8C is another example of the overwriting entry selection according to the present embodiment.

For instance, if the entry 3 was selected as the overwriting entry last time, a bit of the mask for round robin 501 corresponding to the entry 3 is set to "0", as shown in FIG. 8C, and as a result, a bit corresponding to the entry 3 in the result of the logical AND operation becomes "0". Therefore, a bit 503 is detected by the priority encoder, which means that the entry 2 is selected as the overwriting entry. Subsequently, because the bit 503 is detected at this time, a bit of the mask for round robin 501 corresponding to the entry 2 is changed to "0". Thereafter, if the overwriting entry is selected while the bit of "1" is located at the position of the generation 0 in the generation-management bit strings of all of the entries, the entry 1 and the entry 0 will be selected as the overwriting entry in order. When all bits of the mask for round robin 501 are to be changed to "0", the mask for round robin 501 is initialized with all bits set to "1".

In this manner, even when the correspondence relations of all of the entries are changed at the virtually same time, and when it is necessary to select an overwriting entry, it is possible to select the overwriting entry with fair, by performing a logical AND operation with a portion of the newest generation in the bit string obtained by rearranging the generation-management bit string and the mask for round robin 501.

As described above, according to the present embodiment, the generation-management bit string provided in each of the entries of the path-management table 330 is rearranged, a bit of "1" located at a direction of the oldest generation is detected, and an entry corresponding to the detected bit of "1" is selected as an overwriting entry. With this scheme, an entry having the oldest correspondence relation registered can be easily selected without comparing the time elapsed since the correspondence relation between the transmission-source address and the reception-port number is registered, and as a result, it is possible to update a table with fair and efficiency while suppressing an increase of the processing load.

According to an embodiment of the present invention, a correspondence relation between a transmission-source address of a frame and a port through which the frame is received is stored in each entry of a management table, a generation-management bit string in which an indicator bit is arranged at a position corresponding to a time elapsed since the entry is updated is held for each entry, a frame is received from a port, it is determined whether there is an entry to which the correspondence relation for the transmission-source address of the received frame can be registered. When it is determined that there is no entry to which the correspondence relation can be registered, the indicator bit located at a position indicating a longest time elapsed is detected in a bit string obtained by rearranging the generation-management bit strings of all entries according to the time elapsed, an entry corresponding to the detected indicator bit is selected as an overwriting target entry to be overwritten, and the management table is updated by registering the correspondence relation between the transmission-source address of the received frame and the port through which the frame is received to the selected overwriting target entry. Therefore, an entry having the oldest correspondence relation registered can be easily selected without performing a calculation of the time elapsed, and as a result, it is possible to update a table with fair and efficiency while suppressing an increase of the processing load.

Furthermore, according to an embodiment of the present invention, the transmission-destination address of the received frame is searched from the management table, and when there is an entry to which the transmission-source address is registered, the entry is determined as the entry to which the correspondence relation can be registered. Therefore, if the transmission-source address of the received frame is already registered to the management table, the correspondence relation between the transmission-source address and the port can be updated without wasting the vacant entries.

Moreover, according to an embodiment of the present invention, because the port through which the frame is received is registered to the entry that is determined to be the entry to which the correspondence relation can be registered, it is possible to update a correspondence relation between the same transmission-source address and the port in a latest state.

Furthermore, according to an embodiment of the present invention, a position of the indicator bit in the generation-management bit strings of the entry that is determined to be the entry to which the correspondence relation can be registered is changed to a bit of generation indicating a shortest time elapsed. Therefore, the time elapsed since a correspondence relation registered to an entry is updated can be precisely managed, and as a result, it is possible to execute an aging process appropriately.

Moreover, according to an embodiment of the present invention, the management table holds a vacancy-management bit, which indicates whether an entry is vacant, in association with each entry, and when there is an entry that is indicated to be a vacant entry by the vacancy-management bit, the vacant entry is determined as the entry to which the correspondence relation can be registered. Therefore, as long as there is a vacant entry, the correspondence relation between the transmission-source address and the port can be registered without overwriting other entry.

Furthermore, according to an embodiment of the present invention, the correspondence relation between the transmission-source address of the received frame and the port through which the frame is received is registered to the vacant entry that is determined to be the entry to which the correspondence relation can be registered. Therefore, the correspondence relation between the transmission-source address and the port can be updated in the latest state every time a frame is received.

Moreover, according to an embodiment of the present invention, a bit of generation indicating a shortest time elapsed in the generation-management bit string of the vacant entry, which is determined to be the entry to which the correspondence relation can be registered, is set as the indicator bit, and the vacancy-management bit is changed. Therefore, the time elapsed since a correspondence relation registered to an entry is updated can be precisely managed, and at the same time, it is possible to maintain a vacancy state of the entry correctly.

Furthermore, according to an embodiment of the present invention, the generation-management bit strings of all entries is rearranged by coupling bits of all entries for each generation having an equal time elapsed. Therefore, a bit string can be obtained from the generation-management bit strings provided in each of a plurality of entries, and as a result, it is possible to detect an indicator bit with certainty, and to select an overwriting target entry.

Moreover, according to an embodiment of the present invention, the indicator bit is detected after masking a bit portion of the generation indicating a shortest time elapsed from among the bit string obtained by rearranging the generation-management bit string. Therefore, even when the generation-management bit strings of all of the entries is not changed after updating the generation-management bit string according to an overwriting of the entry, it is possible to select an overwriting target entry with fair, preventing a case in which only one entry is repeatedly selected as the overwriting target entry.

Furthermore, according to an embodiment of the present invention, a masking of hiding a bit corresponding to the indicator bit that has been previously detected is performed in the bit portion of the generation indicating the shortest time elapsed. Therefore, a fairness in selecting the overwriting target entry can be maintained with certainty, preventing a case in which an entry corresponding to the previously detected indicator bit is consecutively selected as the overwriting target entry.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A path control apparatus that controls a communication path by relaying a frame including a transmission-source address and a transmission-destination address, the path control apparatus comprising:
    a receiving unit that includes a plurality of ports, and receives the frame from any one of the ports;
    a storage unit that stores therein a management table that includes
        a correspondence relation between the transmission-source address of the frame and a port through which the frame is received in each entry, and
        a generation-management bit string for each entry including a plurality of generation bits indicating a plurality of generations, wherein one of the generation bits for an entry corresponds to a time elapsed since the entry was updated and is set as an indicator bit for the entry;
    a determining unit that determines whether there is an entry to which the correspondence relation for the transmission-source address of the received frame can be registered;
    a selecting unit that, when the determining unit determines that there is no entry to which the correspondence relation can be registered, detects an indicator bit located at a position indicating a longest time elapsed in a bit string that is obtained by coupling the generation bits for all entries by the generations, and selects an entry corresponding to the detected indicator bit as an overwriting target entry to be overwritten; and
    an updating unit that registers the correspondence relation between the transmission-source address of the frame and the port through which the frame is received to the selected overwriting target entry in the management table in the storage unit, and changes a position of the indicator bit in the generation-management bit strings of the selected overwriting target entry to a generation bit of a generation indicating a shortest time elapsed.

2. The path control apparatus according to claim 1, wherein
    the determining unit includes a searching unit that searches the transmission-source address of the frame from the management table, and
    when there is an entry to which the transmission-source address is registered, the determining unit determines the entry as the entry to which the correspondence relation can be registered.

3. The path control apparatus according to claim 2, wherein the updating unit registers the port through which the frame is received to the entry that is determined to be the entry to which the correspondence relation can be registered by the determining unit.

4. The path control apparatus according to claim 3, wherein the updating unit changes a position of the indicator bit in the generation-management bit strings of the entry to a generation bit of a generation indicating a shortest time elapsed, when the entry is determined to be the entry to which the correspondence relation can be registered by the determining unit.

5. The path control apparatus according to claim 1, wherein
    the management table holds a vacancy-management bit, which indicates whether an entry is vacant, in association with each entry, and
    when there is an entry that is indicated to be a vacant entry by the vacancy-management bit, the determining unit determines the entry as the entry to which the correspondence relation can be registered.

6. The path control apparatus according to claim 5, wherein the updating unit registers the correspondence relation between the transmission-source address of the frame and the port through which the frame is received to the vacant entry that is determined to be the entry to which the correspondence relation can be registered by the determining unit.

7. The path control apparatus according to claim 6, wherein the updating unit sets a generation bit of a generation indicating a shortest time elapsed in the generation-management bit string of the vacant entry, which is determined to be the entry to which the correspondence relation can be registered by the determining unit, as the indicator bit, and changes the vacancy-management bit.

8. The path control apparatus according to claim 1, wherein the selecting unit detects the indicator bit after masking the generation bits of a generation indicating a shortest time elapsed from among the bit string obtained by coupling the generation bits.

9. The path control apparatus according to claim 8, wherein the selecting unit performs a masking of a generation bit that has been previously detected as the indicator bit in the generation bits of the generation indicating the shortest time elapsed.

10. A table updating method for a path control apparatus that controls a communication path by relaying a frame including a transmission-source address and a transmission-destination address, the table updating method comprising:
    receiving the frame from any one of a plurality of ports;
    determining whether there is an entry to which a correspondence relation for the transmission-source address of the frame can be registered in a management table that stores the correspondence relation between the transmission-source address of the frame and a port through which the frame is received in each entry, and holds a generation-management bit string for each entry including a plurality of generation bits indicating a plurality of generations, wherein one of the generation bits for an entry corresponds to a time elapsed since the entry was updated and is set as an indicator bit for the entry;

detecting, when it is determined that there is no entry to which the correspondence relation can be registered at the determining, an indicator bit located at a position indicating a longest time elapsed in a bit string that is obtained by coupling the generation bits for all entries by the generations;

selecting an entry corresponding to the detected indicator bit as an overwriting target entry to be overwritten;

registering the correspondence relation between the transmission-source address of the received frame and the port through which the frame is received to the selected overwriting target entry in the management table; and changing a position of the indicator bit in the generation-management bit strings of the selected overwriting target entry to a generation bit of a generation indicating a shortest time elapsed.

11. The table updating method according to claim 10, wherein the determining includes searching the transmission-source address of the received frame from the management table, and when there is an entry to which the transmission-source address is registered, the determining includes determining the entry as the entry to which the correspondence relation can be registered.

12. The table updating method according to claim 11, wherein the updating includes registering the port through which the frame is received to the entry that is determined to be the entry to which the correspondence relation can be registered at the determining.

13. The table updating method according to claim 12, wherein the updating includes changing a position of the indicator bit in the generation-management bit strings of the entry to a generation bit of a generation indicating a shortest time elapsed, when the entry is determined to be the entry to which the correspondence relation can be registered at the determining.

14. The table updating method according to claim 10, wherein the management table holds a vacancy-management bit, which indicates whether an entry is vacant, in association with each entry, and when there is an entry that is indicated to be a vacant entry by the vacancy-management bit, the determining includes determining the entry as the entry to which the correspondence relation can be registered.

15. The table updating method according to claim 14, wherein the updating includes registering the correspondence relation between the transmission-source address of the received frame and the port through which the frame is received to the vacant entry that is determined to be the entry to which the correspondence relation can be registered at the determining.

16. The table updating method according to claim 15, wherein the updating includes setting a generation bit of a generation indicating a shortest time elapsed in the generation-management bit string of the vacant entry, which is determined to be the entry to which the correspondence relation can be registered at the determining, as the indicator bit; and changing the vacancy-management bit.

17. The table updating method according to claim 10, wherein the selecting includes detecting the indicator bit after masking the generation bits of a generation indicating a shortest time elapsed from among the bit string obtained by coupling the generation bits.

18. The table updating method according to claim 17, wherein the selecting includes performing a masking of a generation bit that has been previously detected as the indicator bit in the generation bits of the generation indicating the shortest time elapsed.

* * * * *